(12) United States Patent
Goldhor

(10) Patent No.: US 9,760,259 B2
(45) Date of Patent: Sep. 12, 2017

(54) DIGITAL MEDIA PLAYER BEHAVIORAL PARAMETER MODIFICATION

(71) Applicant: Enounce, Inc., Palo Alto, CA (US)

(72) Inventor: Richard S. Goldhor, Belmont, MA (US)

(73) Assignee: Enounce, Inc., Palo Alto, CA (US)

( * ) Notice: Subject to any disclaimer, the term of this patent is extended or adjusted under 35 U.S.C. 154(b) by 0 days.

(21) Appl. No.: 14/522,810

(22) Filed: Oct. 24, 2014

(65) Prior Publication Data
US 2015/0046813 A1    Feb. 12, 2015

Related U.S. Application Data

(63) Continuation of application No. 11/695,821, filed on Apr. 3, 2007, now Pat. No. 8,874,436, which is a continuation of application No. 10/133,201, filed on Apr. 25, 2002, now abandoned.

(60) Provisional application No. 60/286,881, filed on Apr. 26, 2001.

(51) Int. Cl.
| | |
|---|---|
| *G06F 15/00* | (2006.01) |
| *H04N 5/765* | (2006.01) |
| *H04N 5/931* | (2006.01) |
| *H04N 9/80* | (2006.01) |
| *G06F 3/00* | (2006.01) |
| *H04N 5/445* | (2011.01) |
| *H04N 7/173* | (2011.01) |
| *G06F 3/0484* | (2013.01) |
| *H04N 5/76* | (2006.01) |
| *H04N 21/4147* | (2011.01) |
| *H04N 21/422* | (2011.01) |
| *H04N 21/433* | (2011.01) |
| *H04N 21/439* | (2011.01) |
| *H04N 21/4402* | (2011.01) |
| *H04N 21/443* | (2011.01) |
| *H04N 5/783* | (2006.01) |

(52) U.S. Cl.
CPC ............ *G06F 3/0484* (2013.01); *H04N 5/76* (2013.01); *H04N 21/4147* (2013.01); *H04N 21/42203* (2013.01); *H04N 21/4331* (2013.01); *H04N 21/4392* (2013.01); *H04N 21/4438* (2013.01); *H04N 21/440281* (2013.01); *H04N 5/783* (2013.01)

(58) Field of Classification Search
CPC ......... H04N 21/2387; H04N 21/47217; H04N 21/6587
See application file for complete search history.

(56) References Cited

U.S. PATENT DOCUMENTS

| | | | |
|---|---|---|---|
| 6,259,441 B1 * | 7/2001 | Ahmad et al. ................ | 715/720 |
| 6,408,128 B1 * | 6/2002 | Abecassis ..................... | 386/239 |

(Continued)

FOREIGN PATENT DOCUMENTS

WO    WO 00/22611 A1 *    4/2000    ............ G10L 21/04

*Primary Examiner* — Kyu Chae
(74) *Attorney, Agent, or Firm* — Blueshift IP, LLC; Robert Plotkin

(57) ABSTRACT

One embodiment of the present invention is a method for playing a portion of a media work which includes steps of: (a) playing the media work; (b) receiving input from a user; (c) analyzing parameters to determine the portion of the media work to play; (d) altering at least a part of the portion; and (e) playing the portion.

8 Claims, 4 Drawing Sheets

(56) References Cited

U.S. PATENT DOCUMENTS 8,874,436 B2 * 10/2014 Goldhor .................. 704/200
2002/0038374 A1 * 3/2002 Gupta et al. ............. 709/231

* cited by examiner

DIGITAL MEDIA PLAYER BEHAVIORAL PARAMETER MODIFICATION

BACKGROUND

Many digitally encoded audio and audio-visual works are stored as data on hard-drives, CD-ROMs, Digital Video Disks ("DVD"), magnetic tape, and servers (such as, for example, and without limitation, file servers or streaming media servers) that are accessible via the Internet for users to download. Such audio or audio-visual works may be distributed over a communications channel such as, for example, and without limitation, a computer bus, a local area network ("LAN"), an intranet, and the Internet. Digitally encoded audio and audio-visual works may also be distributed over broadcast channels such as cable television channels or radio channels, or over a telephone channel as part of a telephony or other communication system. In addition, digitally encoded audio and audio-visual works may be captured or synthetically generated and distributed over a communications channel, as described above, without being stored as data in any central location. In accordance with any such distribution, data representing a media work (i.e., any one or any combination of any one or more of) comprises: (a) audio; (b) video, (c) a pictorial representation (cartoon or animation); (d) text; (e) an audio-visual work; (f) a multimedia work; and (g) meta data including, without limitation, transcripts and close captioning, resides in storage, and is transferred to a playback device.

Often when listening to a media work that is being played back, a listener will realize that he/she did not hear, or see, or understand something that was just presented. For example, if the media work is a recorded telephone message, a speaker may have spoken a telephone number too rapidly to be copied down or memorized. Or, if the media work is a lecture, the lecturer may have said something that was difficult to understand; or the lecturer may have presented a complex diagram momentarily, and immediately moved on to something else. This problem may occur when the media work is played back at a normal rate. However, if the media work is played back at a playback rate that is faster than normal (using for example, but not exclusively, Time-Scale Modification technology available from Enounce Incorporated of Palo Alto, Calif.) this problem may occur more frequently. In these situations, a listener or viewer will attempt to back up and replay a portion of the work.

One well-known technique for providing playback of an audio or audio-visual work is referred to as "streaming." As is well known, streaming entails downloading data that represents the audio or audio-visual work, and initiating playback before the entire work has been received. One disadvantage of streaming is that from time to time noticeable gaps in audio content and/or defects in visual content occur due to interruptions in the flow of data resulting from network traffic, congestion, transmission errors, and the like. However, this disadvantage can be reduced by utilizing a data buffer within a media player that caches a number of seconds of content. In a typical implementation that provides buffering, media data flows into the buffer before it is consumed by the player.

To minimize the gaps or defects described above, the buffer must be kept reasonably full, and thus must be filled before playback commences. As a result, whenever a user skips to a new location in the media stream, including a location already played, a re-buffering interruption occurs while buffered portions of the media work are discarded, and the buffer is refilled from the media storage device. These re-buffering interruptions can be tedious and annoying since they may occur at the precise moment the user is trying to back up and replay a portion of interest. In addition, as the viewer/listener waits for playback to be resumed, he/she may lose or forget the context of the passage or the previous utterance.

One prior art method for handling a back up and review request from a user is to require the user to perform a "seek" operation. For streaming media, for example, and without limitation, the seek operation may initiate a re-broadcast of an audio or audio-visual work each time a user requests a different location, i.e., a location that is ahead of, or behind, the current playback location in the audio or audio-visual work. This prior art method has a disadvantage in that the user must wait before playback of the work begins. Another disadvantage of this prior art method in the case of back up and replay for streaming media occurs because a media server must fulfill a request to reposition, and then retransmit data that has already been sent. As a result, the server is taxed to retransmit information that the playback device or software has recently received. This causes an increase in server load during heavy use since multiple requests may arrive simultaneously, and storage access patterns and broadcast load can vary widely. As a result, the media server's capacity to serve a number of clients in a reasonable time may be limited, and network resources for such retransmission may be limited.

As one can readily appreciate from the above, a need exists in the art for a method and apparatus for solving one or more of the above-described problems.

SUMMARY

One or more embodiments of the present invention advantageously satisfy one or more of the above-described problems. In particular, one embodiment of the present invention is a method for playing a portion of a media work which comprises steps of: (a) playing the media work; (b) receiving input from a user; and (c) analyzing parameters to determine the portion of the media work to play. In accordance with another embodiment of the present invention, the method further includes a step of altering at least a part of the portion.

Other features and advantages of various aspects and embodiments of the present invention will become apparent from the following description and from the claims.

DETAILED DESCRIPTION

One or more embodiments of the present invention entail receiving input from a user providing an indication of a desire for replay of a portion of a media work. As used herein, the term media work is used in the broadest sense possible, and includes, without limitation, information used to represent, encode, or reconstruct any one or any combination of any one or more of: (a) audio; (b) video, (c) a pictorial representation (cartoon or animation); (d) text; (e) an audio-visual work; (f) a multimedia work; and (g) meta data including, without limitation, transcripts and close captioning. In addition, further embodiments of the present invention entail receiving input from the user that is used to alter at least a part of the portion of the content to be replayed, or that is used to alter playback control parameters, in an effort to increase the intelligibility of the content being replayed.

In accordance with one embodiment of the present invention, a "Say Again" System is used in the context of a multimedia content store, a plurality of multimedia content servers, a multimedia player, a plurality of multimedia transformation and rendering components, and a plurality of multimedia output devices. The storage for the multimedia content may be local to the multimedia player, or the content store and server may be remote from the multimedia player, with the multimedia content delivered as streaming media over a local or wide area network such as the Internet. The multimedia player and renderers may be any electronically controllable media processing components, and the output devices may be any of a plurality of digital storage or display devices.

In accordance with one such embodiment, a user can activate a "Say Again" Trigger Mechanism during playback of multimedia content by a multimedia player program (such as, for example, a RealNetworks® RealPlayer® Media Player or a Microsoft Windows™ Media Player) by, for example, pressing a button labeled, for example, "Say Again" on a graphics user interface. When the Say Again button is pressed, the Say Again Trigger Mechanism is activated. In response, playback is momentarily paused; the current playback location is set back by an amount specified by a Backup Time parameter (for example, five seconds); the playback rate may be reduced from whatever playback rate was in effect when the Say Again button was pressed to a fraction of that playback rate specified by a Repeat Speed parameter (for example, 50 percent); and playback is resumed. Playback continues at the new playback rate until a playback location is reached where the Say Again button was pressed. Playback continues beyond that point at a steadily increasing playback rate, until, after a number of seconds specified by a Recovery Time parameter, the playback rate is once again what it was at the moment that the Say Again button was pressed.

Figure 1:
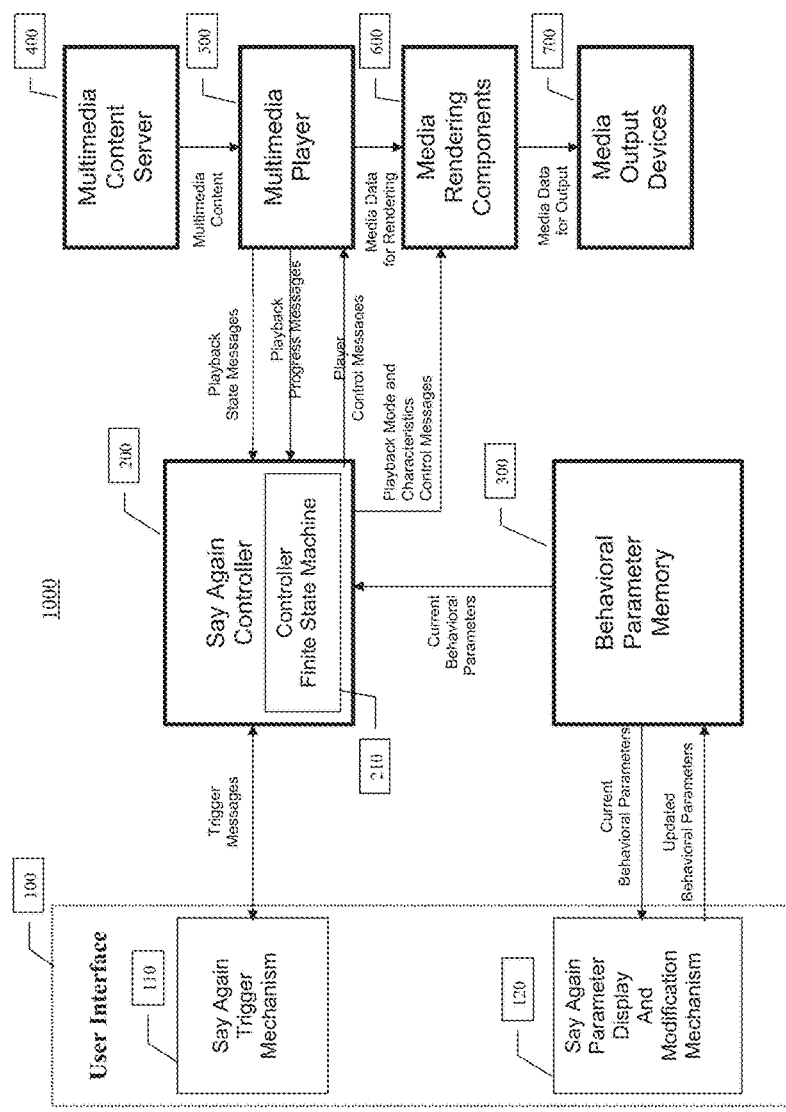
FIG. 1 shows a block diagram of one embodiment of the present invention.

FIG. 1 shows a block diagram of "Say Again" System 1000 which is fabricated in accordance with one embodiment of the present invention and which provides, among other things, backup and replay of multimedia content (including, without limitation, audio in a wide variety of digital voice platforms and devices). As shown in FIG. 1, User Interface 100 comprises Say Again Trigger Mechanism 110, and Say Again Parameter Display and Modification Mechanism 120 ("SAPDMM 120") used to set parameters that affect behavior of Say Again System 1000.

Say Again Trigger Mechanism 110 provides information to a user (for example, by means of a graphics display), and receives input from the user indicating the user's desire to back-up and repeat a specified segment of a media work being rendered. In response to user input, Say Again Trigger Mechanism 110 produces, as output, Trigger Messages that are applied as input to Say Again Controller 200 from User Interface 100. Trigger Messages may take any one of a number of forms that are well known to those of ordinary skill in the art for passing information (including, for example, and without limitation, the form of: an electrical signal in the case of a circuit, a software message, an interrupt, a datagram, a packet, or a flag) indicating a trigger has been activated by the user.

Say Again Trigger Mechanism 110 may include the use of the following to receive user input (by way of example but not limitation): a keyboard which is activated by a key press, a keypad having multiple buttons, each with a label, wherein when any of the buttons are pressed, a Trigger Message is constructed with that button's label; a foot pedal which is activated by a foot pedal press; a button on a screen controlled by a software program which is activated by a mouse click; a microphone which is activated by a spoken command; speech recognition; or any other type of input device or mechanism capable of receiving user input. The user input may also include input of trigger parameter values. These parameters can be integers, strings, or other variable types, and are encoded into the Trigger Messages.

Figure 2:
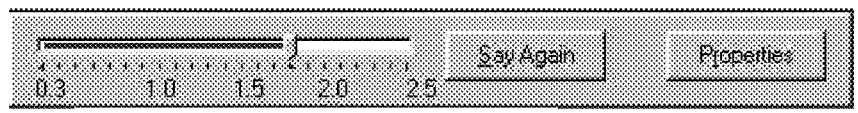
FIG. 2 shows one embodiment of a graphics user interface that is used to present information to, and receive information from, a user to enable the user to trigger a "Say Again" function.

FIG. 2 shows one embodiment of a graphics user interface generated by Say Again Trigger Mechanism 110 that is used to present information to, and receive information from, a user to enable the user to trigger a "Say Again" function. As shown in FIG. 2, "Say Again" button 2000 is used to activate the "Say Again" function by mouse click. As further shown in FIG. 2, speed control slider 2010 on SpeedBar 2015 is used to control playback speed manually. SpeedBar 2015 can be implemented in accordance with one embodiment of the present invention that runs under Microsoft's Windows™ operating system using commonly-understood techniques for implementing Windows™ applications dialog boxes.

In accordance with this embodiment, whenever a mouse click is made over button 2000 labeled "Say Again," Say Again Trigger Mechanism 110 generates a Say Again Message that is sent from User Interface 100 to Say Again Controller 200. Whenever a mouse click is made over button 2020 labeled "Properties," SAPDMM 120 displays Say Again Property Sheet shown in FIG. 3.

Figure 3:
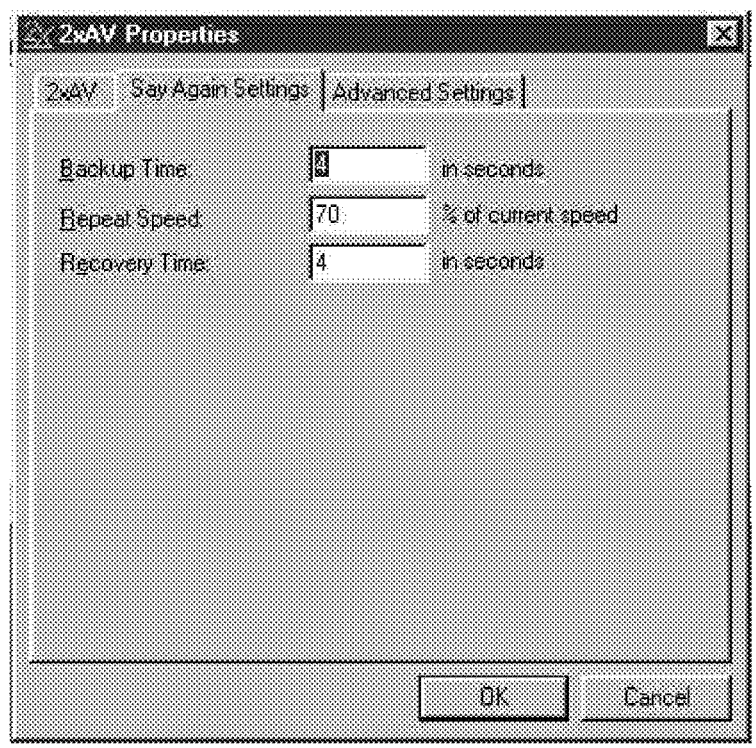
FIG. 3 shows one embodiment of a graphics user interface that is used to present information to, and receive information from, a user to enable the user to set and/or modify Say Again Behavioral Parameters.

FIG. 3 shows one embodiment of a graphics user interface generated by SAPDMM 120 that is used to present information to, and receive information from, a user to enable the user to set and/or modify Say Again Behavioral Parameters. In particular, FIG. 3 shows Property Sheet dialog box 3000 that can be implemented in accordance with one embodiment of the present invention that runs under Microsoft's Windows™ operating system using commonly-understood techniques for implementing Windows™ applications dialog boxes.

In accordance with one embodiment of the present invention, the Say Again Behavioral Parameters are software parameters or variables that the user can set to control the behavior of the Say Again function. As will be described in detail below, their range and scope are chosen so that, in conjunction with user input and the state of Say Again Controller 200, changing their values will change the behavior and utility of the Say Again function.

Useful Say Again Behavioral Parameters include, but are not limited to, an amount of time that a playback location should be moved back, a change in playback speed that should be effected during a repetition period, a change in audio volume during a repetition period, and a duration of a recovery period following a repetition. In addition, as will be described below, for embodiments in which a user can modify code that is executed by Say Again Controller 200, that modifiable code constitutes a subset of the Say Again Behavioral Parameters.

In accordance with one embodiment of the present invention, the Say Again Behavioral Parameters that affect actions of Say Again System 1000 include:
   a. Backup Time: The number of seconds that a playback location should be pushed back when Say Again button 2000 is pressed. In accordance with one embodiment the default is 5 seconds.
   b. Repeat Speed: In accordance with one embodiment, this parameter is a percentage, i.e., the playback speed will begin at this fraction of the playback rate in effect just before Say Again button 2000 was pressed. In accordance with one embodiment the default is 50%.
   c. Recovery Time: The number of seconds over which the playback rate should climb from a "Say Again" playback rate to the original playback rate when playback once again reaches the point at which Say Again button 2000 was pressed. In accordance with one embodiment the default is 5 seconds.

In accordance with one embodiment of the present invention, the Say Again Behavioral Parameters are initialized to predetermined "reasonable" values before Say Again System 1000 is brought online. Then, for example, mouse clicking over button 2020 labeled "Properties" enables the user to display and modify the Say Again Behavioral Parameters. One advantage of making the Say Again Behavioral Parameters user modifiable is that the user can tune the behavior of the Say Again action to best suit the user's purpose in triggering that Say Again action.

As shown in FIG. 1, SAPDMM 120 receives as input: (a) Current Behavioral Parameters from Behavioral Parameter Memory 300 ("BPM 300"); and (b) user input (using, by way of example but not limitation: a keyboard which is activated by a key press, a foot pedal which is activated by a foot pedal press; a button on a screen controlled by a software program which is activated by a mouse click; a microphone which is activated by a spoken command; or any other type of input device or mechanism capable of receiving user input) to manipulate the value of a Behavioral Parameter. SAPDMM 120 produces as output: Updated Behavioral Parameters that are sent from User Interface 100 to BPM 300. SAPDMM 120 displays the values of the parameters numerically or by pictorial representation and enables the user to manipulate the values.

As further shown in FIG. 1, BPM 300: (a) receives, as input, values for the Say Again Behavioral Parameters from SAPDMM 120; and (b) produces, as output, stored values of the Say Again Behavioral Parameters, which values, in turn, are applied as input to SAPDMM 120 and Say Again Controller 200. The user's preferred parameter values for the Say Again Behavioral Parameters can be stored (or "persisted") from invocation to invocation of the Say Again mechanism by storing the values in a file, in a database, or in a system repository such as the Windows™ Registry. There are many techniques that are well known to those of ordinary skill in the art for receiving, storing, retrieving and outputting digital values, for example using random access memories, hard disks, registry settings, local files, and the like.

As further shown in FIG. 1, Say Again Controller 200 ("SAC 200") receives as input: (a) Trigger Messages from Say Again Trigger Mechanism 110 through User Interface 100; (b) Current Behavioral Parameters from BPM 300; (c) Playback State Messages from Multimedia Player 500; and (d) Playback Progress Messages from Multimedia Player 500. SAC 200 produces as output: (a) Player Control Messages that are applied as input to Multimedia Player 500; and (b) Playback Mode and Characteristics Messages that are applied as input to Media Rendering Components 600.

In accordance with one embodiment of the present invention, the Playback Progress Messages are data structures that are created by a sender module, sent to a messaging library for handling, and then delivered to any number of software modules that have registered a method to be invoked by which such message structures are to be delivered to the registering module. The message structures actually transmitted, queued, delivered, and processed using such a scheme include so-called Time-Scale Modification ("TSM") Messages that contain requests for changes in playback speed, and notifications that such changes have been accomplished. They also include Output Messages, in which notifications are broadcast that Multimedia Player 500 has started, paused, or stopped playback, and notifications are broadcast of playback progress, including information as to current playback location in the multimedia content, and the amount of time elapsed since playback last resumed.

In accordance with one embodiment of the present invention, Say Again Controller 200 controls Multimedia Player 500, including such functions as pausing, seeking backward and forward, resuming play, stopping play, starting up or shutting down any of a plurality of streams within the multimedia content, providing a new stream or locator information identifying a new stream to be played, and any other useful functions of Multimedia Player 500 that can be programmatically controlled. In accordance with one embodiment of the present invention, the control is carried out using a Component Object Model ("COM") C++ pure abstract class interface specifying methods for pausing, stopping, and resuming playback, and for seeking to some location within the playback media, beginning either with the beginning or end of the media, or offset from the current location. Both the RealNetworks® RealPlayer® Media Player and Microsoft Windows™ Media Player support such COM interfaces, and both RealNetworks and Microsoft offer Software Development Kits (SDKs) which document how their player products can be controlled using those interfaces.

In accordance with one embodiment of the present invention, Say Again Controller 200 controls the mode and perceptual characteristics of playback. Examples include changing playback speed, changing playback volume, and changing the mode or quality of a decoding process used to render multimedia content. If various quality decoding algorithms are available, this enables Say Again Controller 200 to switch from one quality to another. If the source of the player input stream (Multimedia Content Server 400) can supply input of various bandwidths, this enables Say Again Controller 200 to switch from one bandwidth to another.

In accordance with one embodiment of the present invention, the Playback Mode and Characteristics Control Messages are TSM messages discussed above. For example, by generating and broadcasting so-called TSM REQUEST messages, Say Again Controller 200 can request a TSM engine to modify the playback rate, or speed. Such messages can also modify the quality of the Time-Scale Modification calculations used, the Time-Scale Modification algorithm used, and/or the amplitude of the audio output.

SAC 200 comprises a state machine, and techniques for implementing a state machine in software are well known to those of ordinary skill in the art. During playback, SAC 200 begins in one of a plurality of quiescent states that makes it available for executing the "Say Again" function. Whenever SAC 200 receives a "Say Again" Trigger Message from Say Again Trigger Mechanism 110, it executes the Say Again function by effecting a transition to one of a plurality of initial action states. Over time SAC 200 transitions from one action state to another in response to various inputs it receives. It may remain in, or transition between, various action states indefinitely, or such transitions may be designed to bring SAC 200 back to some quiescent state after a fixed period of time.

As a consequence of the transition between one state to another, and as a consequence of remaining in a state without transition, SAC 200 may send Player Control and Playback Mode and Characteristics Control Messages to effect changes in various playback modes and characteristics. For instance, SAC 200 may raise the volume of the output signal by a certain amount when it enters one of its action states, and then gradually lower the volume over time until the volume has returned to its original level. Other parameters, including but not limited to, playback speed and decoding quality, can also be varied as the result of entry into a particular state, amount of time that SAC 200 has been in a state, upon exit from a particular state, as a function of the amount of content played back while in a particular state, or any combination of these or other system parameters. The time course of such changes may eventually bring the playback modes and characteristics back to their pre-Say Again values, or they may continue changed indefinitely.

In accordance with one embodiment of the present invention, SAC 200 states and their general meaning are as follows:
  a. INVALID: State SAC 200 is in before initialization;
  b. DISABLED: State SAC 200 is in when playback is not underway;
  c. AVAILABLE: Quiescent state SAC 200 is in during playback when the Say Again function is not underway;
  d. SAYINGAGAIN: Initial action state: SAC 200 transitions to this state whenever a Trigger Message is received, and remains in that state until the Say Again function is cancelled, or playback returns to the point that it was at when the Trigger Message was received;
  e. RECOVERING: Final action state: SAC 200 transitions from the SAYINGAGAIN state to the RECOVERING state, and remains there until it transitions to any of the other states.

In accordance with one or more embodiments of the present invention, SAC 200 effects changes in the playback of multimedia content as SAC 200 enters a particular state, receives playback, temporal, or other information while SAC 200 is in a state, or exits a state. SAC 200 effects these changes by executing program code that invokes Player Control and Playback Mode and Characteristics Control Messages. The changes that SAC 200 can effect include, but are not limited to, causing Multimedia Player 500 to jump to a different location in the content (such as backward 4 seconds), playing the material at another speed (such as 50 percent slower), changing the volume (such as play the material 4 dB louder), eliminating one or more streams of content (such as muting a sound track), inducing Multimedia Content Server 400 to switch between an input stream of one bandwidth to another or from one stream to another, or changing the mode of playback (such as switching to a frame-by-frame mode in which each frame of a sequence of images is displayed until the user presses a key, whereupon the next frame is displayed). Many other effects could be devised which might be advantageous to the listener's or viewer's understanding, or serve other purposes of the user. For example, the underlying properties of the media work may be examined, and such information from the analysis of the signal used to determine the type of modification, if any, that may be applied in an effort to increase intelligibility. As an example, the amplitude of the audio portion of the media relative to the amplitude of the audio portion of previously presented portions of the media work could be examined, and if the amplitude (i.e., volume) were lower than other passages, the replayed portion of the media work may be modified to increase the volume and thereby increase the intelligibility. In still another example, the word rate in the audio portion of the media work can be examined, and used to determine an alternative playback speed which increases intelligibility or transcribability. In yet another example the number of objects, for example faces, in the video portion of a media work can be computed, and used to determine if the video portion of the signal should be replayed with increased clarity by image enhancement techniques, or by requesting a higher quality encoding of the portion of the media work.

In general, SAC 200 can respond to additional Trigger Messages while it is in any state, including action states, and can handle such "multiple" signals in a meaningful manner. In other words, the particular Say Again function effected can be dependent on the state that SAC 200 is in when a Trigger Message is detected, and the behavior of SAC 200 may be advantageously different when the user generates a trigger while a previous Say Again action is still underway.

In accordance with one embodiment of the present invention, SAC 200 operates as follows:

Until the Say Again Controller is initialized, the state is INVALID.

When the Say Again Controller is initialized, the state is set to DISABLED.

When the Say Again Controller receives an Output Message indicating that playback has begun, the state is set to AVAILABLE.

When a Say Again Trigger Message is received during playback (with SAC 200 in any state), the following events are effected:
  1) Playback is paused momentarily, the player is instructed to seek backward a number of seconds specified by the Backup Time parameter;
  2) The current playback speed is stored for later use;
  3) The current playback speed is reduced by a fractions specified by the Repeat Speed parameter;
  4) Playback is resumed;
  5) The SAC 200 state is transitioned to SAYINGAGAIN.

When the current state is SAYINGAGAIN, and an Output message is received indicating that Backup Time seconds of content have been output, the SAC 200 state is transitioned to RECOVERING.

When the current state is RECOVERING, as periodic Output messages are received, the following events take place:
  1) The current playback speed is smoothly increased until after Recovery Time seconds it is back to its original value.
  2) The SAC 200 state is transitioned to AVAILABLE.

This behavior is summarized in Table 1 below.

TABLE 1

| Current Say Again State | Comment Regarding Current State | Message Received | New Say Again State |
|---|---|---|---|
| INVALID | initial state | Say Again Controller initialized | DISABLED |
| DISABLED | Say Again function isn't legal | Output Message: playback has begun | AVAILABLE |
| AVAILABLE | Say Again function is legal | Say Again Trigger Message | SAYINGAGAIN |
| SAYINGAGAIN | Say Again function is being executed | Output Message: Content duration played while in SAYINGAGAIN mode is greater than or equal to Backup Time Behavioral Parameter | RECOVERING |
| | | Say Again Trigger Message | SAYINGAGAIN |
| RECOVERING | recovery from Say Again function is underway | Output Message: Content duration played while in RECOVERING mode is greater than or equal to Recovery Time Behavioral Parameter | AVAILABLE |
| | | Say Again Trigger Message | SAYINGAGAIN |

In accordance with one or more embodiments of the present invention, for SAC 200, the program code associated with each state will be fixed. However, it would be advantageous in some embodiments for that program code to be variable so that a user could modify it. In accordance with such embodiments, the program code associated with each state may be one considered to be a subset of the Say Again Behavioral Parameters, and as such, may be displayed to and modified by the user. The code could be represented in the form of scripting language text, such as Java, Basic, JavaScript, Perl, Scheme, LISP, etc. In such embodiments, SAC 200 will comprise a scripting language interpreter, and as each Say Again state is entered, a new set of scripts will be installed for interpretation by SAC 200. Further, it would be advantageous in some embodiments if the components of Say Again System 1000 took the form of "object oriented" programming constructs such as Java, CORBA, or COM objects, whose properties could be accessed and modified, and whose control methods could be invoked, by such general scripting commands. In such embodiments it would be further advantageous if those scripting commands could define, display, control, and monitor user interface elements such as buttons, sliders, selectors, text fields, and so forth, and if the procedures defined in those general scripting commands could vary according to the detected value of user input as presented through such controls.

Given that the program code executed by SAC 200 when it is in a particular state can be general scripting commands, it should be clear that the effect of the Say Again function can be completely general, i.e., encompassing changes to the playback characteristics of the multimedia stream as well as other, completely unrelated, effects such as, for example and without limitation, generating and sending text and/or logging information to a file, creating and sending email messages, triggering the launching of other applications, carrying out mathematical computations, creating, altering, deleting, enhancing, storing, and transmitting media content and associated information, creating and inserting bookmarks, tags, and other such information into the media content or an index file for use in future playback of the media work, and so forth.

As further shown in FIG. 1, Multimedia Content Server 400 provides, as output, media works to Multimedia Player 500, for example, as streaming media content that is delivered over the Internet, a local-area network (LAN), or from files stored in the computer that is executing Multimedia Player 500. Using techniques that are well known to those of ordinary skill in the art, Multimedia Content Server 400 receives, as input, messages or other information conveying requests for: (a) a particular media work; (b) a particular data rate, bit-rate, and/or encoding quality of said media work; (c) a location offset into the media work from which transmission should begin, and (d) various parameters such as buffer fill rate, maximum data delivery rate, and duration of work to send. It should be understood that Multimedia Content Server 400 may take the form of a database, local disk cache, local hard drive, or server located in any geographical location connected to a network. For ease of understanding the current invention the numerous possible forms of multimedia server have been omitted.

As further shown in FIG. 1, Multimedia Player 500 receives, as input: (a) Multimedia Content from Multimedia Content Server 400; and produces, as output: (a) Media Data for Rendering that is applied as input to Media Rendering Components 600. Multimedia Player 500 should be understood to be interpreted in the broadest possible sense, and includes without limitation, software programs such as, for example, the RealNetworks® RealPlayer® Media Player, Windows™ Media Player, QuickTime™ Player, and all manner of software capable of presenting audio, text, video, visual representations, meta-data and any combination of the foregoing running on a computer, for example, under some version of the Microsoft Windows™ operating system. Embodiments of the present invention may be implemented on, in, or as a general purpose computer, a so-called Personal Digital Assistant (PDA), a set-top box, and Internet appliance, a consumer or professional entertainment device, an electronic game, a telephone, a communication device, a television set, a radio, or a player of some other sort.

As further shown in FIG. 1, Media Rendering Components 600 receives, as input, Media Data for Rendering, and produces, as output, raw media samples to be rendered such as PCM-coded audio signals or image bitmap values. Media Rendering Components 600 controls the appearance, timing, and quality of the media renditions—that is, the final presentations of the audio, video, or other contents of the media. It also may be responsible for decoding Media Data that has been encoded for reasons having to do with efficiency of transmission, robustness of representation, security and privacy of the information transmitted, or for many other reasons.

Execution of Media Rendering Components 600 is controlled by various control parameters, including but not limited to a) a volume control parameter; b) a playback rate control parameter; c) a decoding quality control parameter; d) a stereo balance control parameter; and e) a color temperature control parameter. In turn, SAC 200, or other components, can control the behavior and performance of Media Rendering Components 600 by sending, from time to time, updated values of these and other control parameters to Media Rendering Components 600 in Playback Mode and Characteristics Control Messages.

As further shown in FIG. 1, Media Output Devices 700 receive, as input, Media Data for Output. Media Output Devices 700 are well known to those of ordinary skill in the art, and a variety of commercially available components are available to render Media Data for Output including without limitation: (a) sound cards for audio, and (b) computer graphics cards, frame-buffers, monitors, televisions, and the like for video and text.

In accordance with another aspect of the current invention, the Say Again button can be pressed multiple times in rapid succession. The first time the button is pressed, the behavior is as described above. After that, the behavior is as follows:

If the button is pressed before the playback location is reached at which the button was first pressed (during the "Backup Period"), SAC 200 interprets this action to mean, "you didn't go back far enough." Accordingly, the effective Backup Time is increased (for example, doubled), the current location is again set back (for example, twice as far as the last time), and playback resumes at the same speed as after the first button press. Also, the effective Recovery Time is increased (for example, doubled). The location at which recovery begins remains unchanged. This increase (for example, doubling) of Backup Time and Recovery Time continues each time that the button is pressed during a particular Backup Period.

If the button is pressed during a Recovery Period, SAC 200 interprets this action to mean, "I want to listen to the same material again, and don't be so quick to speed up." Accordingly, playback is momentarily paused, the current location is set once again to the location where the just-completed repetition began, and playback begins again. The speed is the usual Say Again speed. However, the effective Recovery Period is increased (for example, to be twice as long as the original setting).

All Say Again parameter settings are returned to their original values whenever the Recovery Period is completed, or playback is halted, or the end of the media is reached. In general, the current state of SAC 200 can affect its response to any trigger mechanism, and result in an alternative behavior and response different from the default behavior described above.

Thus, clicking on the "thumb" of speed control slider 2010 on SpeedBar 2015 is a very quick way to reset all Say Again parameters to their property sheet values, and simultaneously cancel any ongoing Say Again playback effects.

Although FIG. 1 shows embodiment 1000 to be comprised of separate modules, in a preferred embodiment, User Interface 100, Say Again Trigger Mechanism 110, Say Again Parameter Display and Modification Mechanism 120, Behavioral Parameter Memory 300, Say Again Controller 200, Controller Finite State Machine 210, Multimedia Content Server 400, Multimedia Player 500, and Media Rendering Components 600 are embodied as software programs or modules which run on a general purpose computer such as, for example, a personal computer. It should be well known to one of ordinary skill in the art, in light of the detailed description above, how to implement these programs or modules in software.

Conversely, components of embodiment 1000 may exist in separate locations connected to one another via a network or any other communication means (where the use of the term means is used in the broadest sense possible).

In addition, it should be clear to those of ordinary skill in the art that one or more embodiments of the present invention may be combined with any number of apparatus which provide time-scale modification, and may be combined with or share components with such systems.

As should be clear to those of ordinary skill in the art, embodiments of the present invention include the use of any one of a number of algorithms for determining the behavior of the overall system. Parameters such as duration, playback speeds, and rewind intervals can all be determined by heuristics, adaptive algorithms, neural networks and the like.

In accordance with one embodiment of the present invention, whenever a user manually changes playback speed, any Say Again processing is automatically cancelled. In accordance with a further embodiment of the present invention, Say Again processing is also cancelled when the user stops the player, and whenever playback reaches the end of a media file or stream. In accordance with a still further embodiment of the present invention, before and after playback (that is, when no playback is taking place), the Say Again button is disabled, and may not be pressed; however, the Say Again properties may be displayed and modified.

Although the detailed description above used the terms playback rate and TSM rate, and the terms playback and playback apparatus, these terms should be understood to include any type of presentation rate (i.e., a rate of presentation of information) and any type of presentation apparatus. As such, these terms are to be understood as being used in the broadest sense. In addition, although the detailed description used the terms media, media work, media data, media broadcast, audio or audio-visual work, and information, these terms should be understood to refer to any type of information or data. As such, these terms are to be understood as being used in the broadest sense.

It should also be understood that lack of comprehension is not the only reason that a user might want to replay a portion of content. For example, the user may have recognized the beginning of an important sequence, and want to begin recording the content in a different format as it was played back. Or the user might want to begin rendering the media using a higher-quality, but more resource-intensive, rendering technique. As another example, there may be a need to control presentation rates of online media, and quickly repeat information for the purposes of clarifying an utterance. In particular, calls to a 911 emergency response service may have more incoming calls than personnel to listen to them. In that case, speeding up audio can help with transcribing and dispatching appropriate information over a computer network. Clarifying an address quickly with a "Say Again" feature can provide an important reduction in response times. Similarly, in military and other rescue operations, repeating targeting information such as longitude and latitude coordinates quickly may be vital to achieving a quick and accurate response. In addition, a public service announcement regarding emergency information, safety information, emergency response, and the like may be missed if a user is listening at a very fast rate (learning impaired and hearing impaired individuals may wish to have important public service or emergency broadcasts played at playback rates below the normal playback rate to aid in comprehension).

One or more embodiments of another aspect of the present invention (referred to as a "Rapid Replay Feature") enable "instantaneous" replaying of Multimedia Content that has been streamed from Multimedia Content Server 400 (for example, a remote server). Normally, in order for Multimedia Player 500 to replay recently played media content, Multimedia Player 500 must send a message to Multimedia Server 400, asking it to retransmit the data for the desired Multimedia Content to be replayed. This may be necessary even though a local copy of the desired data recently resided in the player, because in a typical embodiment of Multimedia Player 500, Multimedia Content is discarded by Multimedia Player 500 as soon as a segment it describes has been rendered.

Figure 4:
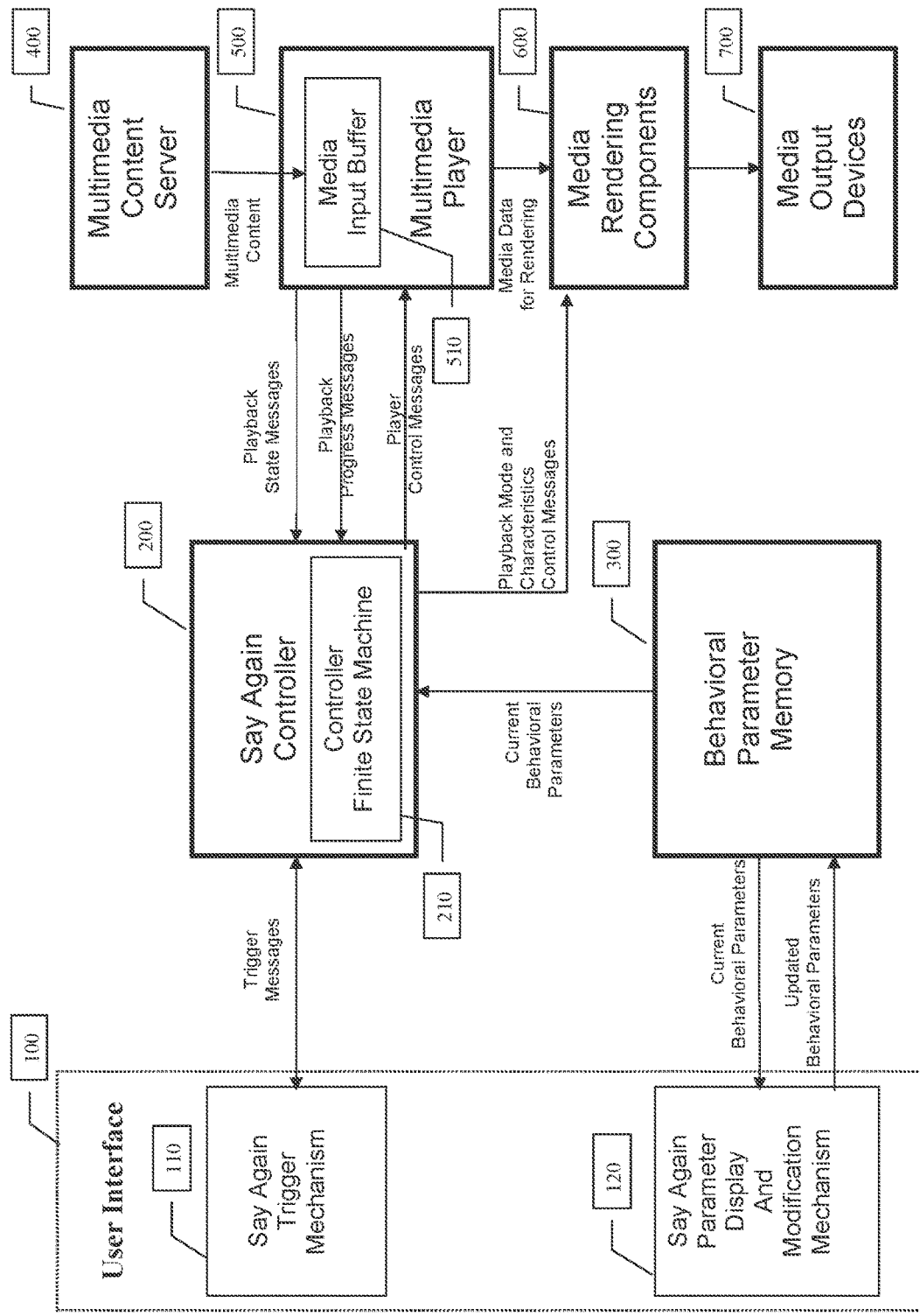
FIG. 4 shows a block diagram of another embodiment of the present invention.

However, this raises an issue in that a pause, gap, distortion, or other perceptible defect may occur whenever Multimedia Server 400 must retransmit the desired Multimedia Content. Such an artifact occurs not only because of the time required for the first elements of the desired data to arrive at Multimedia Player 500, but because, typically, a buffer such as Media Input Buffer 510 shown in FIG. 4, is employed by Multimedia Player 500, and playback is constrained from starting until that buffer has accumulated a certain minimum amount of data, corresponding to a minimum accumulated Multimedia Content in hand.

Such artifacts are undesirable, and many such artifacts can be avoided by retaining a certain amount of Multimedia Content in Media Input Buffer 510 for some period of time even after it has been played.

Figure 5:
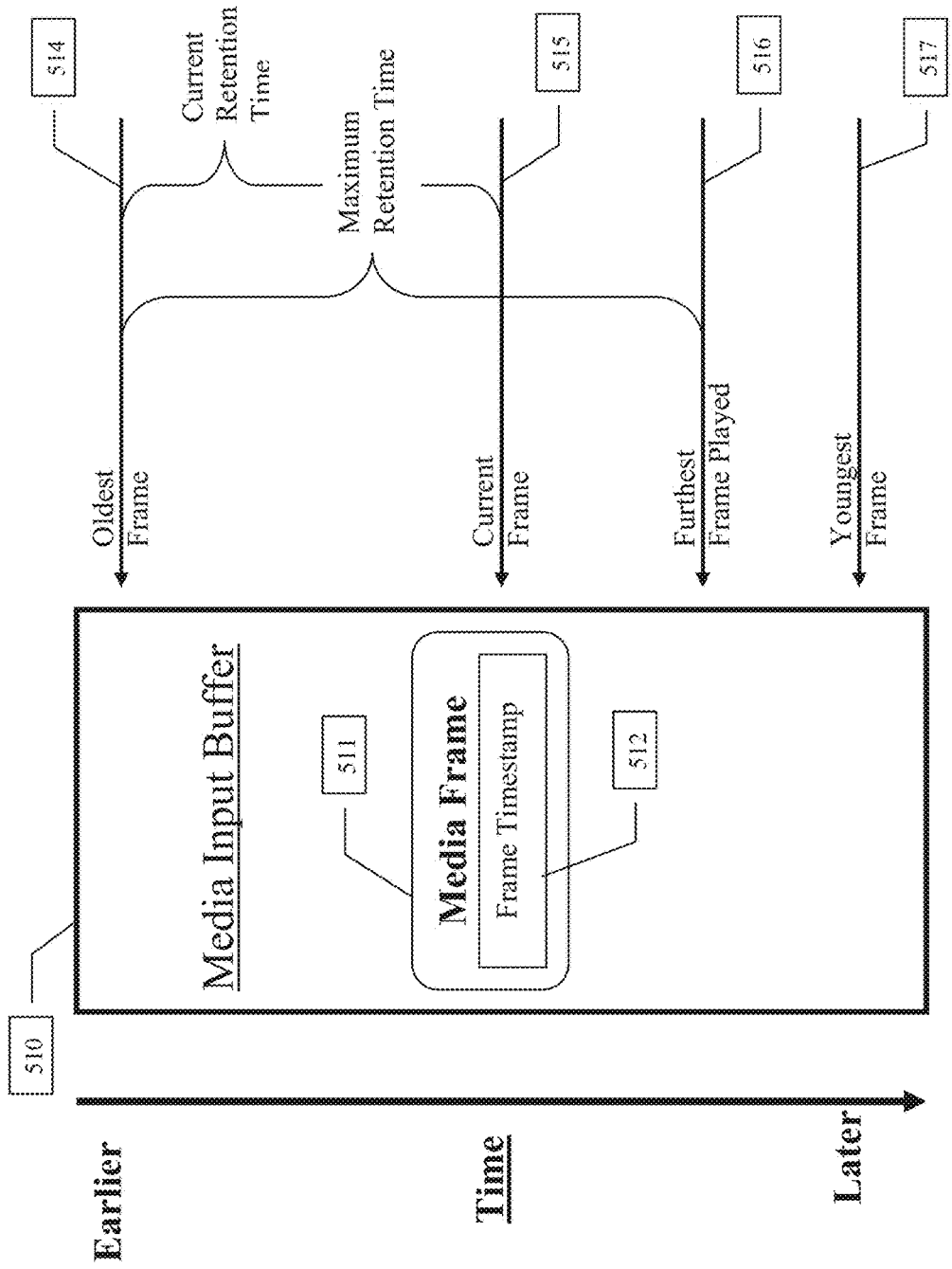
FIG. 5 shows a diagram of a buffering scheme utilized to fabricate one embodiment of the present invention.

FIG. 5 shows a diagram of a buffering scheme utilized to fabricate one embodiment of the present invention. As shown in FIG. 5, Multimedia Content is stored in Media Input Buffer 510 in the form of a plurality of Media Frames 511 wherein each Media Frame holds information necessary to render a moment or interval of Multimedia Content. Associated with each frame is Frame Timestamp 512 which specifies the time within the presentation of the moment or interval described by the contents of Media Frame 511. As shown in FIG. 5, a set of pointers to individual frames in Media Input Buffer 510 is maintained, which pointers are:

1) Oldest Frame: pointer 514 points to a frame holding the oldest (earliest) Multimedia Data in Media Input Buffer 510.
2) Current Frame: pointer 515 points to a frame holding the Multimedia Data currently being played.
3) Furthest Frame Played: pointer 516 points to a frame holding the most advanced (latest in time) Multimedia Data in Media Input Buffer 510 that has been played so far.
4) Youngest Frame: pointer 517 points to a frame holding the most recent (latest in time) Multimedia Data in Media Input Buffer 510. This is the frame for the latest media moment stored in Media Input Buffer 510.

In accordance with one embodiment, media frames arrive from Multimedia Content Server 400 in time-sequential order, with frames having earlier timestamps generally arriving before frames having later timestamps. The frame occupancy of Media Input Buffer 510 is then managed, and "Rapid Replay" made possible, using methods similar to the following:

If Media Input Buffer 510 is empty, the first frame to arrive from Multimedia Content Server 400 is stored in Media Input Buffer 510. Oldest Frame pointer 514 and Youngest Frame pointer 517 are set to point to that frame. Current Frame pointer 515 and Furthest Frame Played pointer 516 are set to a null value.

If Media Input Buffer 510 is not empty when a frame arrives from Multimedia Content Server 400, the newly arrived frame is stored in Media Input Buffer 510. If its timestamp is earlier than the timestamp of the frame pointed to by Oldest Frame pointer 514, that pointer is modified to point to the newly arrived frame. If the timestamp associated with the newly arrived frame is later than the timestamp associated with the frame pointed to by Youngest Frame pointer 517, that pointer is modified to point to the newly arrived frame.

When sufficient media frames are in hand in Media Input Buffer 510, or some other condition or event ensues that initiates playback, Multimedia Player 500 begins to process the first frame. At this point, Current Frame pointer 515 and Furthest Frame Played pointer 516 are set to point to the first frame being processed, which is the frame pointed to by Oldest Frame pointer 514.

From time to time, Multimedia Player 500 is ready to process another frame. Each time this occurs, Current Frame pointer 515 is compared to Youngest Frame pointer 517. If pointer 515 and pointer 517 are equal, playback pauses until another frame arrives from Multimedia Content Server 400, is stored in Media Input Buffer 510, and Youngest Frame pointer 517 has advanced to point to the newly acquired frame. When pointer 517 points to a frame with a later timestamp than pointer 515, pointer 515 is advanced to the next temporally sequential frame in Media Input Buffer 510.

Whenever Current Frame pointer 515 is advanced, it is compared to Furthest Frame Played pointer 516. If pointer 515 points to a frame with a later timestamp than pointer 516, pointer 516 is set equal to pointer 515.

Whenever pointer 516 is advanced, the difference between the timestamp of the frame it points to and the timestamp of the frame that is pointed to by Oldest Frame pointer 514 is calculated. The difference between these two timestamps is the Maximum Retention Time. If the Maximum Retention Time is larger than a Behavioral Parameter entitled Desired Retention Time (the number of seconds of previously-played content that is to be retained in Media Input Buffer 510 during playback), the frame that is pointed to by Youngest Frame pointer 517 is discarded from Media Input Buffer 510, and pointer 514 is advanced to point to the next frame—that is, the frame in Media Input Buffer 510 with the earliest timestamp.

Whenever Multimedia Player 500 receives a Player Control Message requesting a repositioning of its playback location to a media position corresponding to any Media Frame 511 that is stored in Media Input Buffer 510, it can accomplish that repositioning in Rapid Playback Mode. The necessary Multimedia Content information is stored in Media Input Buffer 510, and Multimedia Player 500 can reposition its current location and begin playback immediately.

At any moment during playback, the largest jump back in time that Multimedia Player 500 can accomplish in Rapid Replay mode is the difference between the timestamp of the Current Frame, and the timestamp of the Youngest Frame. This is called the Current Retention Time. The maximum possible jump back in time is possible when Multimedia Player 500 is not currently replaying content—that is, when Furthest Frame Played pointer 516 is equal to Current Frame pointer 515.

In accordance with one embodiment of the present invention, a separate Behavioral Parameter called Desired Retention Time is maintained. In accordance with another embodiment, the Desired Retention Time value is calculated from a Behavioral Parameter Backup Time. For example, Desired Retention Time may be calculated as:

Desired Retention Time=$x$*Backup Time where x is a number equal to or greater than 1.

In accordance with another embodiment, the decision rule to determine whether the Youngest Frame should be discarded may take into account the current playback speed. One possible decision rule is to discard the Youngest Frame if Maximum Retention Time is greater than the product of Desired Retention Time and the current playback speed. Thus, twice the usual media content would be kept on hand if the current playback speed was twice the normal playback speed. Other suitable such decision rules will occur to those of ordinary skill in the art.

Although the examples discussed above focus on modifying the current playback location so as to replay content that has already been played, it will be clear to those of ordinary skill in the art that the new desired playback location could be ahead of the current playback location. The advantages of Rapid Replay would still hold completely or partially if the desired location were already contained in Media Input Buffer 510, or indeed if any of the buffers earlier than the desired new location, but within the specified Desired Retention Time of the desired new location, were contain in Media Input Buffer 510.

In accordance with another embodiment, all or some of the Say Again functionality described above, for example but not limited to the Rapid Replay functionality, is implemented by maintaining a Rendering Data Input Buffer (RDIB) in association with each Media Rendering Component 600. The RDIB for each Component holds the media-specific rendering data sent to that Component by Multimedia Player 500.

In a manner similar to functionality of Media Input Buffer 510 as described above, each of these RDIBs hold some data which has not yet been processed by its corresponding Media Rendering Component, and some data which recently has been processed by that Component. Associated with each RDIB is a set of pointers parallel in function to the Frame pointers 514, 515, 516, and 517.

In such an implementation, when a Say Again function is triggered, SAC 200 sends appropriate Playback Mode Control Messages to each Media Rendering Component 600. These Messages instruct each Component to move its RDIB current position pointer to the desired playback location for its corresponding media stream. SAC 200 then restarts each Media Rendering Component 600.

Throughout this process, Multimedia Player 500 may continue to run without any changed. Alternatively, SAC 200 may temporarily pause the Player so as to prevent data overrun in the Rendering Data Input Buffers, or may instruct the Player to perform some other supportive function, such as generating rendering data with some altered characteristics.

It should be understood that embodiments of the preset invention include the use of any number of behavioral parameters, or code behaviors that affect playback and are not limited to the specific behavioral parameters discussed or described above. For example, and without limitation, behavioral parameters may further include parameters such as: playback location, playback speed; encoding quality; rendered quality, and durations for such parameters to take effect. In addition, it should be further understood that, although one or more of the above-described embodiments indicated that the playback speed should resume to a playback speed in effect at the point in the media work when the "Say Again" trigger was invoked, the present invention is not thusly limited. In fact, embodiments of the present invention exist in which the playback rate is increased, decreased, or moved toward a target playback rate (in accordance with any method of interpreting the behavioral parameters), which playback rate changes can occur at locations which are prior to, or after the location in the media work at which point the trigger was activated. In still further example, the distance from the trigger invocation location can be specified as an offset, a percentage, or means for calculating an amount from the trigger invocation location, etc.

In addition, still further embodiments exist which, instead of backing up and replaying portions at a reduced playback rate, the playback rate during replay is increased. This embodiment advantageously provides a useful review of the previous portions of the media work played for the purpose of verifying transcription, understanding, and the like.

In addition, still further embodiments exist which, instead of backing up and replaying portions of a media work during playback as described above, advance or skim through material by increasing playback speed of a portion, skip over a portion, or any combination thereof. In fact in accordance with one such embodiment, a behavioral parameter may indicate that, upon activation of a trigger mechanism, the encoding quality, and possibly the data rate of the media work, should be decreased while playback speed is increased. Advantageously this may serve to accommodate limited network bandwidth.

Those skilled in the art will recognize that the foregoing description has been presented for the sake of illustration and description only. As such, it is not intended to be exhaustive or to limit the invention to the precise form disclosed.

What is claimed is:

1. A method, performed by a computer processor executing computer program instructions tangibly stored on a non-transitory computer-readable medium, the method comprising:
    (A) before (E)-(H), retrieving, from a behavioral parameter memory, program code associated with each of a plurality of states of a controller;
    (B) before (E)-(H), displaying, to a user, the program code associated with each of the plurality of states of the controller;

(C) before (E)-(H), receiving, from the user, first input representing modifications to a plurality of media player behavioral parameters;
(D) before (E)-(H), at a parameter modification mechanism, modifying, in response to the input from the user, the program code to reflect the modifications to the plurality of media player behavioral parameters;
(E) receiving, at the controller, a first trigger message from a trigger mechanism in response to second input from the user;
(F) in response to receiving the first trigger message:
  (F)(1) installing a first subset of the program code associated with a first one of the plurality of states;
  (F)(2) transitioning the controller into the first one of the plurality of states;
  (F)(3) executing, by the controller, the first subset of the program code while the controller is in the first one of the plurality of states;
(G) receiving, at the controller, a second trigger message from the trigger mechanism in response to third input from the user;
(H) in response to receiving the second trigger message:
  (H)(1) installing a second subset of the program code associated with a second one of the plurality of states;
  (H)(2) transitioning the controller into the second one of the plurality of states; and
  (H)(3) executing, by the controller, the second subset of the program code while the controller is in the second one of the plurality of states.

2. The method of claim 1, wherein the modifications to the plurality of media player behavioral parameters include a modification to a backup time behavioral parameter defining a backup time.

3. The method of claim 1, wherein the modifications to the plurality of media player behavioral parameters include a modification to a repeat speed behavioral parameter defining a presentation rate at which to replay a portion of a digital media work.

4. The method of claim 1, wherein the modifications to the plurality of media player behavioral parameters include a modification to a recovery time behavioral parameter defining a recovery time.

5. A non-transitory computer-readable medium containing computer program instructions executable by a computer processor to perform a method, the method comprising:
(A) before (E)-(H), retrieving, from a behavioral parameter memory, program code associated with each of a plurality of states of a controller;
(B) before (E)-(H), displaying, to a user, the program code associated with each of the plurality of states of the controller;
(C) before (E)-(H), receiving, from the user, first input representing modifications to a plurality of media player behavioral parameters;
(D) before (E)-(H), at a parameter modification mechanism, modifying, in response to the input from the user, the program code to reflect the modifications to the plurality of media player behavioral parameters;
(E) receiving, at the controller, a first trigger message from a trigger mechanism in response to second input from the user;
(F) in response to receiving the first trigger message:
  (F)(1) installing a first subset of the program code associated with a first one of the plurality of states;
  (F)(2) transitioning the controller into the first one of the plurality of states;
  (F)(3) executing, by the controller, the first subset of the program code while the controller is in the first one of the plurality of states;
(G) receiving, at the controller, a second trigger message from the trigger mechanism in response to third input from the user;
(H) in response to receiving the second trigger message:
  (H)(1) installing a second subset of the program code associated with a second one of the plurality of states;
  (H)(2) transitioning the controller into the second one of the plurality of states; and
  (H)(3) executing, by the controller, the second subset of the program code while the controller is in the second one of the plurality of states.

6. The non-transitory computer-readable medium of claim 5, wherein the modifications to the plurality of media player behavioral parameters include a modification to a backup time behavioral parameter defining a backup time.

7. The non-transitory computer-readable medium of claim 5, wherein the modifications to the plurality of media player behavioral parameters include a modification to a repeat speed behavioral parameter defining a presentation rate at which to replay a portion of a digital media work.

8. The non-transitory computer-readable medium of claim 5, wherein the modifications to the plurality of media player behavioral parameters include a modification to a recovery time behavioral parameter defining a recovery time.

* * * * *